Nov. 17, 1942.　　　J. R. MACDONALD　　　2,302,336
METHOD AND APPARATUS FOR KEEPING LIVE SHELL FISH
Filed Nov. 7, 1939
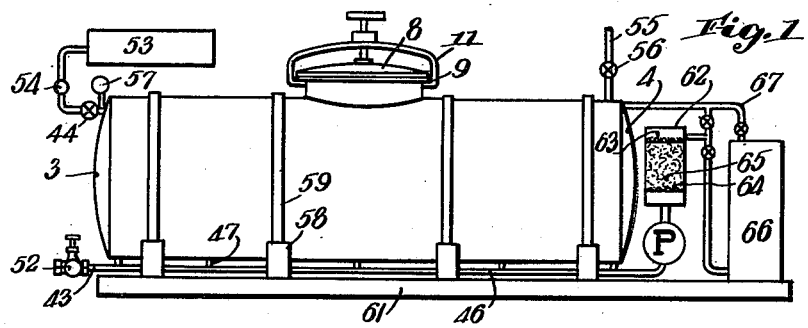

Patented Nov. 17, 1942

2,302,336

UNITED STATES PATENT OFFICE 2,302,336

METHOD AND APPARATUS FOR KEEPING LIVE SHELLFISH

Joseph R. Macdonald, Winchester, Mass.

Application November 7, 1939, Serial No. 303,196

5 Claims. (Cl. 119—2)

This invention relates to a method and apparatus for keeping shellfish (which enter into commerce and distribution for food purposes) alive and in a healthy condition for a prolonged period of time after they have been captured.

It is now the common if not universal practice, when lobsters are shipped, for example, simply to place them on ice or in chilled moist containers and keep them so long as they can withstand such changed conditions, until they die. A day or two is usually the measure of their resistance to such changes, and accordingly it is necessary that they shall be cooked at once in order to be used for food purposes. Lobsters show up to a 5% depreciation in weight due to dehydration while in shipment under the methods now used.

With some other types of commercial shellfish, it may not be so difficult to prolong their life span as with lobsters. Nevertheless, the present invention is applicable to them, to advantage, and will also effectively keep crabs in better condition as well as alive longer than other treatments now known and employed.

Other types of shellfish, which do not have appreciable range of locomotion, such as clams and oysters, are likewise more resistant to removal from the beds in which they normally live, than lobsters, and may survive absence of water for several days. This, even though their natural environment in the sand may be saturated with water continuously, irrespective of tidal movements.

It is therefore an object of the present invention to provide a method of treating such commercial types of shellfish so that they may be kept alive and in healthy condition for a considerable time after being caught. It is also an object to provide such a method and means whereby it may be applied in actual practice during handling, storage, and shipment, and under the various conditions which may be thus imposed. It is also an object to provide and maintain a healthful environment, both with reference to the shellfish and also with reference to the surroundings in which they are kept and the containers used. Other objects will appear from the following disclosure.

It is now discovered that if such shellfish (but more particularly lobsters) when alive, are placed in a hermetically closed container and completely submerged in sea water, and a space is left above the water from which the air is displaced by oxygen or mixed with additional oxygen—preferably under a superatmospheric pressure of several pounds per square inch (3 to 40) —the live shellfish may be preserved alive for a considerable period of time. Further improved results are obtained when the container and its contents are also maintained in a quiescent state. In cases where the container cannot be kept quiescent, however, or in which the contents for any reason may be appreciably disturbed, such as during transportation by ship, rail or motor bus, it is found desirable to withdraw the water and suspended sediment from the bottom, filter it free from such sediment, and then to return the resultant clarified water back into the top of the container, preferably in a fine spray which falls through the oxygen in the top of the container and upon the free surface of the water. As thus treated, lobsters, for example, may be not only kept alive but in healthy condition for a week or ten days and this period may be further prolonged by introducing suitable food upon which the lobsters may feed.

It may be pointed out that, in prior practices of keeping lobsters, especially if they are simply immersed in a small amount of water, even though it be natural sea water and open to the atmosphere, they die very promptly, and sometimes in a matter of a few minutes. It has also been observed that, under like conditions, if the water be agitated, and especially if it be agitated upwardly from the bottom, the lobsters likewise die very soon.

In the former case, the cause of death is not certain, but in the latter case, it is thought that it is due in large part to auto-intoxication.

It may be said of all such shellfish that they require oxygen and that their normal processes of obtaining it are from the water and not from the air. Hence continuous and prolonged exposure to the air will tend to dry up and ultimately prove fatal to the commercial types of shellfish generally. Conversely, by the application of the present invention they may be kept alive and in improved condition after they have been caught or removed from their natural surroundings, for a prolonged period of time, and hence are in improved condition and of enhanced value for food purposes.

A typical instance of the practical application of the treatment will be described with reference to a tank, suitable for mounting upon a motor truck or the like, as illustrated by the accompanying drawing, in which:

Fig. 1 is a side view of the tank, indicating more or less diagrammatically the supplemental equipment provided in connection therewith;

Fig. 2 is a longitudinal cross section of the tank substantially in the center, passing to the rear of the several partitions and hence in front of the shellfish therein, so as to show the latter in full view;

Fig. 3 is a transverse vertical cross section of the tank in the plane of the line 3—3 of Fig. 2 in the direction of the arrows;

Fig. 4 is an enlarged end view of one of the outer chambers or units, removed from the tank;

Fig. 5 is a side view of the chamber or unit shown in Fig. 4; and

Fig. 6 is a perspective view of a tray for the lobsters, removed from the tank and from the chamber or unit which is adapted to receive and hold it.

Since the problem of keeping lobsters is more exacting than with the other shellfish mentioned, the practical application of the invention will be described with reference to them. In its application to other commercial shellfish, however, like conditions may be advantageously applied, although they may not be absolutely necessary in such cases and may be somewhat modified as above indicated and as will be pointed out below.

In the form of apparatus illustrated in Figs. 1 to 5, the tank 1 is cylindrical in form and horizontally positioned, having a circular side wall 2, and dome-shaped end walls 3, 4, sealed to the ends of the side wall along the seams 5, 6, to make the tank as a whole hermetically tight.

The top of the tank is provided with a large manhole 7, which may be circular in shape, but of sufficient size for ready access and in the present installation having a diameter which is approximately half the diameter of the tank. The manhole is provided with a cover 8, and sealing means, such as a gasket 9, or the like, along the rim of the manhole opening and screw clamp 11 to hold the cover firmly thereon and to effect a heremetrically tight closure. Additional manholes may, of course, be provided, and the tank may also be divided up by cross-wall (not shown) in which case a manhole for access to each space thus formed will be necessary.

The inside of the tank 1 will be suitably protected to withstand salt water and oxygen, as by coating it with an inert lining 12, which may be rubber, synthetic resin, or like chemically resistant substance, of which many are now known, which will serve the purpose. Alternatively, the tank may be made from chemically resistant materials, metal, wood or the like. The outside of the tank is also advantageously surrounded by a layer of insulating material 13 to protect the contents from the heat of the sun and also from loss of heat in cold weather.

Transverse sections 14, constituting a series of separate chambers for receiving the lobsters, are fitted into the tank as shown (Fig. 2). Each of these sections is approximately semi-cylindrical in shape, coming up to about the horizontal center of the tank or somewhat above the center (Fig. 3). A number of such sections, eight in the tank here illustrated, fitting closely together longitudinally of the tank, will completely fill the tank from end to end.

Each of the transverse sections 14, as shown is conveniently made up of three independent units (A, B and C) separated vertically, as illustrated in Fig. 3. The outer units A and C are alike, or symmetrical to each other, and comprise a flat bottom 21, parallel, vertical end walls 22, and an outer wall composed of a vertical portion 23 and an inclined portion 24. The walls may be made up of lattices or sheets of perforated or expanded metal, having spaced openings 25 therethrough (insufficiently large to let the lobster fall through them or even to permit his claws to become entangled therewith) and joined at their corners to upright posts 26, as by welding.

The fourth or inner side of the frame or case as thus formed is preferably open. But it has a sufficient number of cross-rods or angle irons 27, between the posts 26, at the top and bottom to give it adequate strength and maintain its shape. On the inner side of each of the vertical end walls 22 is provided a series of horizontal angle irons 28, which are spaced apart vertically by about 4", and attached at their ends to the corner posts 26, as by welding. One edge of each angle iron 29 projects inwardly to form a ledge, so that the angle irons on the opposite walls 22 are opposed and thus afford runways or supports, adapted to receive trays or the like thereon, as will be later described.

The unit B is similarly constructed and of perforate material, but may be rectangular in shape, with a bottom wall, parallel vertical end walls, and side walls (either or both of which may be composed of reinforcing rods only and otherwise open) joined together by vertical corner posts. On the inner side of each of the end walls is mounted a series of opposed horizontal, parallel angle irons, spaced vertically apart by about 4", as in the units A and C, and secured at their ends to the corner posts, as by welding. One edge of each angle iron projects inwardly so that the angle irons on the two sides of the unit oppose each other and provide ledges or runners adapted to receive trays similar to those mentioned in respect of units A and C and to be described in greater detail below.

The units A, B and C may be made of any suitably strong and chemically resistant material, which is without detriment to the lobsters—such as wood, molded compositions, perforated sheet metal or screens, etc. In case of metals being used, however, appropriate protection from salt water is necessary, and may be effected by coating them, and the angle irons and supporting rods, with a chemically resistant material—such as vulcanized rubber, enamel, lacquers, synthetic resins, or like compositions which are tough and resilient, as well as adherent to the metal surfaces.

In charging the tank the lobsters are laid upon trays 37 (Fig. 6) preferably of such size as to accommodate the length of the lobster, which is usually about fifteen inches. The trays may be made of perforate material such as wood or protected metal, or molding compositions, in order to resist salt water, handling, and like conditions involved, as with the units or racks above described. The tray may consist of a perforate bottom 38, end walls 39, and intermediate partitions 41, parallel to the end walls and to each other, dividing the surface of the tray into rectangular spaces (e. g. 4" wide, 4" high, and 15" long), each of which is of an appropriate size and shape to receive one lobster. The partitions are of sufficient height (about 4") to stand above the body of the lobster in each compartment. The ends of the compartments thus formed may be left open, as shown or closed by additional walls, if desired. When filled, with a lobster in each compartment, the tray may be easily handled whether the ends are thus closed or not. The lobster cannot crawl out and it is but a moent before the tray is loaded into the frames or units.

Accordingly, in packing the lobsters for treatment or shipment, these trays are filled with a lobster laid in each compartment, and preferably all heading in one direction. The tray is then slid into one of the units, say unit A, through the open end. For the bottom shelf of this unit a shorter tray 37ª, e. g. holding three lobsters, as shown in Figs. 3 and 4, will be used. Above this longer trays 37ᵇ and 37ᶜ, holding four and five lobsters may be introduced, while on the upper ledges or shelves larger trays 37ᵈ, containing six lobsters, are provided for, and these will be all of the same size. Each tray will be slid in, so as to rest upon a pair of opposed ledges 29, on the horizontal angle irons, as above described, and may then be locked in place by a catch 42 mounted on the corner post 26, or by any suitable fastening device.

As thus filled with trays, with a lobster in each compartment, the units A and C are lowered through the manhole 7 of the tank 1, and placed with their outer, inclined walls against the side walls of the truck, and allowed to come to rest upon low, flat projections or platforms 43 running longitudinally of the bottom of the tank, but spaced apart to leave room for the unit B, through the central portion of the tank.

The unit B is similarly filled with loaded trays 37, with a lobster in each compartment. But since the side walls of the unit B are all vertical, this unit is rectangular and the trays may all be of the same size. The filled unit B is then lowered through the manhole 7 until it rests upon the bottom of the tank 1. It may then be pushed lengthwise of the truck, between the corresponding units A and C to complete the semi-cylindrical section 14. In this way the several sections of the tank are loaded and positioned, commencing at the ends of the tank and finishing at a central point near or immediately beneath the manhole 7.

When the tank is thus filled with the containers, each filled with lobsters, which is effected in a comparatively short time, the manhole 7 may be closed and the cover fastened down by the clamps 11, to make the gaskets or other sealing means air-tight as shown. The valve 44, on the inlet pipe 45, is left open, however, to permit the escape of air while sea water is pumped into the tank through the end of the pipe 46. The latter runs longitudinally of the bottom of the tank and is provided with numerous T-shaped unions 47, each of which in turn passes through the lowest portion of the bottom of the tank 2 and opens into the tank 2 beneath the middle row of units (B) therein. When these units have flat bottom walls, as shown, a sump 48 is formed beneath them and between these bottom walls and the bottom of the tank. Accordingly the sea water enters the tank at the bottom, flows lengthwise through the sump 48 and gradually rises around and through the entire charge of lobsters and containers, immersing the whole charge so that ultimately the sea water 49 stands appreciably above the entire contents of the tank, but also leaves a considerable air space 51 between it and the top of the tank. The valve 52 on pipe 46 is now closed, and the pump (not shown) is disconnected.

The pipe 45 is now connected to a cylinder of compressed oxygen 53 (Fig. 1) usually through a reducing valve 54, since the pressure of the oxygen as thus supplied is of the order of 200 lbs. per square inch and thus would be too great to introduce. The air already contained in the air space 51 may be left therein, for economy. But preferably the air is displaced by the incoming oxygen, as through an opening 55, provided at the top of the tank (since air is lighter than oxygen), the oxygen being introduced near the level of the sea water. When the air is expelled and the air space filled with oxygen, the valve 56 on the opening 55 is closed. Or, if not previously shut, the manhole cover may now be made fast so as to hermetically seal the tank. Further amounts of oxygen are now gradually and steadily introduced, until the pressure, as indicated by a pressure gauge 57 on the oxygen line outside of the tank, is preferably approximately 3 to 30 or 40 pounds per square inch, above atmospheric pressure. The valve 44 is then closed and the oxygen cylinder 53 disconnected and removed from the tank, leaving the oxygen in the tank under superatmospheric pressure. Such superatmospheric pressure simulates the normal pressure of sea water upon lobsters in their native habitat, when caught, and accordingly accommodates the pressure conditions of the tank to the proper functioning of their life processes.

After the required amount of oxygen has been introduced and the desired pressure of the same has been developed in the tank, as above described, there is no need of additional oxygen. Accordingly no supplementary supply of oxygen is needed to accompany the tank for shipment nor any of the mechanism for introducing the sea water or oxygen gas under pressure. The sealed tank contains sufficient oxygen, and retains it under constant pressure, and will keep the charge of lobsters therein alive for a week or ten days or longer, without disturbing them.

As an incident of the self sufficiency of the charged tank, with the contents under positive pressure, it is found that the shipment is automatically protected against differences in the pressure of the atmosphere, due to changes in altitude. Thus containers which are open in any way to the atmosphere (when shipped through mountainous districts and hence subjected to greatly reduced atmospheric pressures) would be subjected to drastic depletion of any dissolved gases contained in the sea water surrounding the lobsters, and hence would in turn subject the lobsters to water which had been vitiated by loss of oxygen, and they would die, as they do in actual practice under such circumstances. But this is prevented by the procedure and conditions herein described and produced.

The tank 2 may be mounted on a motor truck or the like by means of blocks 58, through which the pipe 46 passes and which also carry straps 59 passing over the tank 1 to hold it in place thereon. The blocks 58 are in turn carried upon the floor or chassis of the truck body 61.

The end of pipe 46, opposite to that through which the sea water is pumped to fill the tank, leads to the pump P which may be operated by suitable connection to the motor of the truck or by an electric motor, run by a storage battery or the like (not shown) or other source of power. The pump draws the water from the sump 48 throughout the length of the tank and along with it not only the thicker matter and solids which may already be contained in the sea water but also the excrement from the lobsters which, even though it may not settle by gravity while the truck is in motion, is steadily and uniformly drawn down through the perforated walls of the side walls, trays, and partitions and collected together and removed completely through the sump 48 by the positive action of the pump P.

In this connection, it may be pointed out that if the pump is operated by being connected to the engine of the motor, it will be operated while the motor is running and will stop when the motor is shut off. But while the motor is shut off and the truck is standing still, the contents of the tank also will be quiescent and during such time the solids and heavier matter will settle appreciably by gravity and not remain in the vicinity of the lobsters. It is, of course, preferred to keep the pump in continuous operation.

The solid matter contained in the water drawn off by the pump is filtered out by pumping it through the filter 62. The filter medium employed may be varied according to convenience, but should be adapted to remove as fine particles as possible, consistent with the continuous and effective operation of the pump.

For example, the filter 62 may simply contain a chamber formed by two foraminous partitions 63, 64, between which is charged a mass of finely granular inert material such as sand 65. Suitable chemicals, compatible with the fact of the return of the filtered water to the tank, may also be used to neutralize or overcome any cumulative condition in the tank. Various inert adsorbent materials may be used, such as adsorbent charcoal, a small amount of finely divided limestone (to combine with excess of carbon dioxide or strong acid-forming materials) or like substances for the physical and chemical purification of the water passed therethrough.

From the filter 62 the filtered water may be passed through a refrigerating (or heating) device 66, adjusted to offset adverse temperature effects of the atmosphere, and thence through the pipe 67 which passes through the end wall 4 of the tank into the top of the tank 1.

In this connection, however, it is observed that lobsters under treatment as herein described do not suffer adverse effects from higher temperatures to the extent that they do under conditions heretofore employed. For example, whereas temperatures as high as 70° F. are usually attended by a decidedly high mortality of lobsters as usually kept, temperatures of the tank and contents as herein disclosed may rise as high as 80° F. without appreciable detrimental results upon the lobsters.

The pipe 67 divides into two arms 68, 69, which pass longitudinally along the top of the tank on either side of the manhole. These arms are closed at their ends but are provided with numerous perforations, throughout their length, so that the filtered water, under the force of the pump P is atomized or sprayed into the tank and falls through the oxygen, to which it is thus extensively exposed, and is thus given an opportunity to dissolve the maximum amount possible.

In this way purified water, containing oxygen, is returned directly into the water in the tank. At the same time the oxygen, both in respect of pressure and quantity, as well as concentration, is continuous. And this purified oxygen-saturated water continuously passes down over the lobsters for them to breathe and washes away and carries down impurities, both soluble and insoluble which are thus completely and promptly removed by the filter, as above described. At the same time the water thus returned is otherwise of the same composition as the water in the tank.

It is believed that the superatmospheric pressure of the oxygen in the tank not only retains the lobsters physically under the pressure to which they are accustomed and maintains it substantially constant (as is also the case with the pressure of deep sea water), but that it also promotes the solubility of the oxygen in the water and thus provides water with a higher oxygen content from which the lobster may breathe and utilize it. And since pure oxygen is used instead of (or in addition to) air the diluting effects of inert gases such as nitrogen are not present or are reduced, and the total capacity of the water to dissolve nitrogen and oxygen are substantially available for the dissolution of oxygen alone. Such increased pressure and increased concentration of oxygen will be of increased effect in oxidizing impurities contained in the water and also result in oxidizing them more rapidly and more completely.

In the metabolic processes of lobsters, as well as of animals and man, oxygen plays the ultimate role of oxidizing the blood and in turn oxidizing the food intake. The more oxygen available the more rapidly and the more completely is the course of these oxidizing reactions carried out. Consequently by increasing the concentration and amount of oxygen in the water in which the lobster lives, his oxygen intake (other things being equal in respect of respiration) is necessarily increased and the oxygen reactions of the system are accelerated. There is, therefore, a stimulation of the living processes of the lobster, even though his activities of hunting for food and the like are greatly diminished. A consequence of this is a sustained and in fact more complete oxidation of intermediate products of metabolism in the several stages of the system, including those contained or formed in the fleshy or edible parts of the lobster, and a greater formation and more complete elimination of the ultimate products of oxidation such as carbon dioxide, carbonic acid, water, etc.—as well as of other waste products.

As a result, by actual experience, it is found that lobsters treated as above described not only live longer after being caught than lobsters kept according to prior practices of the art, but that they are in even healthier condition and livelier condition at the end of this greater period of time than at the beginning. Furthermore, the edible parts of the lobster are of a better flavor than they are when the lobster has been kept in customary ways and even of better flavor than lobsters as freshly captured from their natural life in the ocean. This somewhat astonishing result follows because the entire lobster, throughout its respirating and metabolic systems, has been purified by natural processes of oxidation, stimulated by an abundance and increased concentration of oxygen, which has thus been made available to him and which is not available to him in the ocean.

The increased amount of carbon dioxide evolved from this more rapid and more extensive oxidation in the metabolic processes of the lobster, may be in part taken up by placing a suitable selective absorbing agent (or chemical reagent) in the filter, which will not dissolve or, if it does dissolve, will not deleteriously affect the lobsters, as mentioned above. In relative amounts by weight this quantity of carbon dioxide is not great (though it may be large by volume) but in view of its much greater solubility in water than the solubility of oxygen in water, it can dissolve more readily than oxygen, build up a much greater concentration than oxygen, and hence effectively diminish the concentration to which the oxygen may dissolve and greatly decrease the possible relative amount of oxygen in the intake of dissolved gases by the lobster from the water in his vicinity. In short, it may decrease the $O_2:CO_2$ ratio compared to that which was established in the tank as it was first charged. It is therefore sometimes desirable to remove it, especially during long storage or transportation. This may be done by absorption in an appropriate filtering medium, as above pointed out.

Upon arrival at its destination, the tank 1 may be taken off the truck and delivered as it is, and used for continued storage of the lobsters until they are to be used. The excess oxygen is then gradually and uniformly released by opening valve 44 or 56. Then the manhole cover is unclamped and removed, and the units A, B, C lifted out in any convenient way, the trays 37 withdrawn, and the lobsters taken out, ready for use. The sea water may be drained off, by opening the valve 48 on pipe 43, by gravity, either before or after removing the units.

In this way, and with the apparatus shown (or other equivalent constructions and arrangements) lobsters have been kept alive and in good healthy condition for seven to ten days after being caught. If a part of the units only are to be removed, it is preferable to withdraw the units required, leaving the others covered with the sea water. In such cases, the tank may be recharged with oxygen as before and again closed, without deleteriously affecting the lobsters therein, as a result of the opening and closing.

The same equipment and procedure may be employed with other types of commercial shellfish, and more particularly with crabs, clams, oysters, and the like, as above mentioned. The size of the individual containers may be modified, however, by being made either smaller, to receive individual crabs (which are smaller than lobsters) or larger to receive a larger number in one container. But preferably the containers are made shallow, so as to prevent them from climbing over one another and forming piles, which often occurs with them and with lobsters and sometimes results in smothering those on the bottom, in spite of conditions being otherwise favorable to keeping them alive.

With clams and oysters, this difficulty is not encountered, although they may shift under the motions of handling or transportation, with a similar result, or their shells may be cracked or crushed. With them, therefore, it is desirable to provide a loose packing material, such as seaweed, to hold them in position and apart from each other.

It may be noted that the commercial shellfish, (other than lobsters) which are naturally somewhat more resistant to exposure to the atmosphere are consequently able to live longer after being caught and kept in contact with the air. But by the present process and in the present equipment they are kept both wet and surrounded by water, and at the same time supplied with more oxygen in such water than they have ever encountered in their natural environment of sea water. Therefore they do not die from loss of moisture or oxygen but are stimulated by a greater concentration of oxygen and kept alive and in better condition of health than ever before.

In the specification and claims the expression "pure oxygen" is to be construed as meaning gaseous oxygen of such purity as is commonly obtained commercially in pressure cylinders, as distinguished from appreciably diluted oxygen, or greatly diluted oxygen such as the oxygen which occurs in the atmosphere.

This application is a continuation-in-part of my application Serial No. 270,347, filed April 27, 1939.

I claim:

1. Method of keeping commercial types of shellfish, after removal from their natural environment, comprising the steps of placing the live shellfish in a container, submerging the shellfish in sea water, gradually and uniformly introducing an atmosphere of oxygen under pressure into the upper part of the container, hermetically sealing the container, withdrawing water and sediment from the bottom of the container, removing the sediment therefrom, and returning the purified water to the upper part of the container and in contact with the atmosphere of oxygen.

2. Method of keeping commercial types of shellfish, after removal from their natural environment, comprising the steps of placing the live shellfish in a container, submerging the shellfish in sea water, gradually and uniformly introducing an atmosphere of oxygen under pressure into the upper part of the container, hermetically sealing the container, removing the sediment from water taken from the bottom part of the container, returning the purified water to the upper part of the container, and into contact with the oxygen above the water.

3. Method of keeping commercial types of shellfish, after removal from their natural environment, comprising the steps of placing the live shellfish in a container, submerging the shellfish in sea water, gradually and uniformly introducing an atmosphere of oxygen under pressure into the upper part of the container, hermetically sealing the container, removing the sediment from water taken from the bottom part of the container, returning the purified water to the upper part of the container, and atomizing the same into the oxygen above the water.

4. Method of keeping commercial types of shellfish, after removal from their natural environment, comprising the steps of placing the live shellfish in a container, submerging the shellfish in sea water, gradually and uniformly introducing an atmosphere of oxygen under pressure into the upper part of the container, hermetically sealing the container, withdrawing water and sediment from the bottom of the container, removing the sediment and soluble impurities therefrom, and returning the purified water to the upper part of the container and in contact with the atmosphere of oxygen.

5. As an article of commerce, a container, live shellfish therein, submerged in sea water, gaseous oxygen, in a concentration greater than that of the atmosphere, means for maintaining the temperature and pressure in the container substantially constant and equivalent to that of the normal environment of the shellfish, and means for withdrawing the water and solids from the bottom part of the container, removing impurities from the water, and returning the water to the top part of the container and in contact with the atmosphere of oxygen.

JOSEPH R. MACDONALD.